US005269957A

United States Patent [19]

Ikeda et al.

[11] Patent Number: 5,269,957

[45] Date of Patent: Dec. 14, 1993

[54] RUST REMOVING AGENT FOR STAINLESS STEEL SURFACE

[75] Inventors: Mikio Ikeda, Fujisawa; Jun Kataoka, Yokohama, both of Japan

[73] Assignee: Taiho Industries Co., Ltd., Tokyo, Japan

[21] Appl. No.: 836,399

[22] Filed: Feb. 18, 1992

[30] Foreign Application Priority Data

Feb. 18, 1991 [JP] Japan ................................ 3-043958

[51] Int. Cl.[5] ........................ C02F 5/10; C23F 11/10; C09K 3/00

[52] U.S. Cl. .................................. 252/86; 252/389.2; 252/142; 252/87; 252/146

[58] Field of Search ..................... 252/86, 87, 80, 180, 252/142, 146, 387, 388, 389.2

[56] References Cited

U.S. PATENT DOCUMENTS

| | | | |
|---|---|---|---|
| 3,424,688 | 1/1969 | Boiko et al. | 252/87 |
| 3,973,998 | 8/1976 | Datta et al. | 252/527 |
| 4,435,303 | 3/1984 | Abadi | 252/87 |
| 4,477,364 | 10/1984 | Garcia | 252/87 |
| 4,749,508 | 6/1988 | Cockrell, Jr. et al. | 252/142 |
| 4,784,789 | 11/1988 | Jeschke et al. | 252/174.23 |
| 4,877,459 | 10/1989 | Cockrell, Jr. et al. | 252/142 |
| 4,959,105 | 9/1990 | Neidiffer et al. | 252/142 |

FOREIGN PATENT DOCUMENTS

| | | |
|---|---|---|
| 2461612 | 7/1976 | Fed. Rep. of Germany . |
| 1476840 | 6/1977 | United Kingdom . |

*Primary Examiner*—Prince Willis, Jr.
*Assistant Examiner*—J. Silbermann
*Attorney, Agent, or Firm*—Oblon, Spivak, McClelland, Maier & Neustadt

[57] ABSTRACT

A rust removing agent for a stainless steel surface of an aqueous solution of phosphoric acid, a polyhydroxymonocarboxylic acid or a salt thereof and a surfactant.

7 Claims, No Drawings

RUST REMOVING AGENT FOR STAINLESS STEEL SURFACE

BACKGROUND OF THE INVENTION

1. Field of the Invention

This invention relates to a rust removing agent for a stainless steel surface, which removes rust and invisible rust formed on a stainless steel surface.

2. Description of the Prior Art

Stainless steel has found utility in numerous applications. However, depending on atmospheric and other various environmental conditions, rust or invisible rust sometimes forms on the surfaces of cast or shaped products of stainless steel.

Such rust and invisible rust degrade the smoothness of a stainless steel surface. Particularly, in the case of a building material for interior use or a finishing material made of stainless steel, the rust and invisible rust impair the good appearance of the material. In the case of ordinary structural members of stainless steel which are joined by welding, the rust and invisible rust often degrades the strength of union.

Further, when the rust once formed is left standing, the corrosion originating in the rust advances and grows into pitting corrosion or goes to impair the strength of the stainless steel partially or wholly, possibly causing various troubles. Various methods have been proposed and applied for the removal of such rust. A method which attains removal of rust from a stainless steel surface by immersing the stainless steel article in an acid wash bath formed by combining such strong acids as sulfuric acid, hydrochloric acid, hydrofluoric acid, and nitric acid, a method which effects removal of rust from a stainless steel surface by preparing a viscous pasty coating agent by mixing an acid wash with a viscosity enhancer such as acid clay or carboxymethyl cellulose (C.M.C.) or with a film-forming agent such as vinyl acetate, an alginate, or gelatin, applying the coating agent to the rusted stainless steel surface, allowing the coating agent to react with the rust on the surface, and thereafter washing off or peeling the applied layer of the coating agent, and a method which accomplishes removal of rust from a stainless steel surface by subjecting the stainless steel article to an electrolytic treatment in an electrolytic solution thereby inducing generation of hydrogen from the surface may be cited, for example.

Among the methods described above, the method involving the immersion of the stainless steel article in the acid wash bath and the method involving the application of the acid wash in the form of a viscous pasty coating agent to the surface both use an acid wash incorporating strong acids therein and, therefore, require special care in the handling of the hazardous chemical and to the selection of equipment suitable for use in carrying out the treatment.

Further, the aforementioned acid wash acts not only the rust but also on the stainless steel itself and eventually coarsens the surface under treatment. In some cases the stainless steel surface which has been treated with the acid wash will require an extra passivating treatment for imparting corrosion resistance to the surface.

The method involving the electropolishing treatment of a stainless steel surface with an electropolishing bath requires a long time for the treatment and necessitates use of a high capacity power source and electrolytic device because the stainless steel article under treatment serves as one of the electrodes for the electrolysis. This method, therefore, is not suitable for the removal of locally formed rust and inapplicable to the treatment of stainless steel used in structural members joined by welding.

This invention was accomplished in the light of the problems of prior art described above and has as its object to provide a rust removing agent which is capable of quickly and efficiently removing rust formed on a stainless steel surface.

Another object of this invention is to provide a rust removing agent which is capable of passivating a stainless steel surface without causing corrosion of the surface or necessitating any special treatment.

SUMMARY OF THE INVENTION

To accomplish the objects described above, the rust removing agent of this invention comprises a mixture of an aqueous solution of phosphoric acid, a polyhydroxymonocarboxylic acid or a salt thereof, and a surfactant.

The rust removing agent which is composed of the components mentioned above attains easy removal of rust formed on a stainless steel surface either by the application of this rust removing agent to the rust-forming stainless steel surface or the immersion of the rust-forming stainless steel article in the rust removing agent. When the rust removing agent applied on the stainless steel surface is treated by the use of an electropolishing device and consequently caused to react with a metal oxide, the electropolishing action produced by the treatment removes the rust and gives a finishing polish to the surface.

The other objects and other characteristics of this invention will become apparent from the following detailed description of the invention.

DESCRIPTION OF THE PREFERRED EMBODIMENT

The rust removing agent of this invention is obtained by mixing an aqueous phosphoric acid solution having 100 to 200 parts by weight of concentrated phosphoric acid (adjusted to a specific gravity of 1.7) incorporated in 100 parts by weight of water with a polyhydroxymonocarboxylic acid or a salt thereof and a surfactant.

The polyhydroxymonocarboxylic acids and salts thereof which are usable effectively herein include glyceric acid, trihydroxybutyric acid, 3,4,5-trihydroxyhexanoic acid, gluconic thereof, for example. Optionally, two or more of these compounds may be jointly used.

The amount of the aforementioned polyhydroxymonocarboxylic acid or a salt thereof to be used in the rust removing agent is in the range of from 0.5 to 20 parts by weight per 100 parts by weight of the concentrated phosphoric acid (adjusted to a specific gravity of 1.7). The polyhydroxymonocarboxylic acid or the salt thereof incorporated in the rust removing agent fails to manifest its effect if the amount thereof is less than 0.5 part by weight. If this amount exceeds 20 parts by weight, the excess does not make a proportional contribution to the effect and may precipitate in the agent at low temperatures owing to decreasing solubility.

The surfactant to be used in this invention is desired to be a nonionic surfactant particularly of the type having a hydrophile-lypophile balance (HLB) of 8 to 15. Nonionic surfactants which answer this description include such ether type surfactants as polyoxyethylene allylalkyl ethers, polyoxyethylene alkyl ethers, and polyoxyethylene-polyoxypropylene block polymers.

It is nevertheless permissible to use an anionic surfactant instead of the aforementioned nonionic surfactant or to use an ester type nonionic surfactant instead of the aforementioned ether type nonionic surfactant.

The amount of the surfactant to be used in the rust removing agent of this invention is in the range of from 0.01 to 5 parts by weight, based on 100 parts by weight of the concentrated phosphoric acid (adjusted to a specific gravity of 1.7). The surfactant produces no discernible effect if this amount is less than 0.01 part by weight. Conversely, if this amount exceeds 5 parts by weight, the excess does not make a proportional contribution to the effect.

Though the rust removing agent proposed by this invention has the aforementioned three components as its essential constituents, it may additionally incorporate therein a small amount of such inorganic acids as hydrofluoric acid, sulfuric acid, and nitric acid or such organic acids as sulfamic acid and sulfanilic acid when the rust formed on the stainless steel surface is large.

The largest allowable amounts of an inorganic acid and an organic acid are respectively about 5 parts by weight and about 10 parts by weight, based on 100 parts by weight of the concentrated phosphoric acid. If their amounts exceed these upper limits, the excesses corrode the stainless steel matrix and cause coarsening of the skin.

The removal of rust from the surface of a relatively small stainless steel article by the use of the rust removing agent of this invention is attained by simply keeping the stainless steel article immersed in the rust removing agent for a prescribed time.

When the stainless steel article is relatively large or when the stainless steel has already been used in joined structural members, the removal of rust can be easily attained by applying the rust removing agent to the rust on the stainless steel surface.

When the rust removing agent is applied on the surface of a stainless steel article and an electric current is passed through the applied layer of the rust removing agent by the use of an electropolishing device, the electropolishing action consequently produced efficiently cleanses the surface.

The rust removing agent of this invention assumes a viscosity on the order of several Cps (centipoises). owing to this viscosity, the rust removing agent cannot cause any hindrance when the stainless steel article is immersed in the rust removing agent as described above.

Even when the stainless steel article is relatively large or when the stainless steel has already been used in joined structural members, the retention of the applied layer of the rust removing agent of the degree of viscosity mentioned above for a prescribed period on the stainless steel surface can be attained without fail so long as the surface is horizontal. If the stainless steel surface under treatment is upright, however, the applied layer of the rust removing agent having the degree of viscosity mentioned above tends to run and cannot be retained in contact with the surface for the required period.

Such running can be precluded by increasing the viscosity of the rust removing agent to a level in the range of from 500 to 50,000 cps by the incorporation of an inorganic powder such as of magnesium sulfate, sodium sulfate, aluminum sulfate, sodium nitrate, aluminum nitrate, bentonite, silica, or activated clay. If the enhanced viscosity falls short of 500 cps, the running cannot be sufficiently precluded. If this viscosity exceeds 50,000 cps, the rust removing agent is difficult to apply uniformly on the stainless steel surface.

The rust removing agent of this invention is produced by mixing an aqueous phosphoric acid solution, a polyhydroxymonocarboxylic acid or a salt thereof, and a surfactant as described above. The removal of rust or sympathetic rust formed on a stainless steel surface can be easily attained by immersing the stainless steel article in the rust removing agent or applying the rust removing agent on the stainless steel surface.

Such quick and efficient removal of rust from a stainless steel surface as attained by this invention cannot be accomplished when the polyhydroxymonocarboxylic or a salt thereof contained in the rust removing agent of this invention are replaced by an organic acid such as, for example, a carboxylic acid such as formic acid (monocarboxylic acid) or oxalic acid (dicarboxylic acid) or an hydroxycarboxylic acid such as glycolic acid (monohydroxycarboxylic acid), citric acid (monohydroxytricarboxylic acid), or tataric acid (dihydroxydicarboxylic acid).

What is responsible for this difference in the effect or rust removal between the polyhydroxymonocarboxylic acid or salt thereof and the organic is not yet known. It has been demonstrated as shown in the following examples, however, that the presence of at least one carboxyl group is an indispensable requirement, and that the effect of rust removal decreases in proportion to the number of carboxylic acids and increases in proportion to the number of hydroxyl groups.

Further, since the rust removing agent of this invention is incapable of corroding a stainless steel surface, the treatment with this rust removing agent is economical in terms of both cost and time because it has no need for any additional treatment for passivation.

As described above, the rust removing agent of this invention attains easy removal of rust from a stainless steel surface by the immersion of the stainless steel article in the rust removing agent or the application of the rust removing agent to the stainless steel surface.

The rust removing agent of this invention, therefore, is capable of quickly and efficiently removing rust and invisible rust formed on a stainless steel surface. Thus, it contributes to improving the appearance of stainless steel used in building interior members or finishing members, enhancing the strength of union in joined structural members of stainless steel, and imparting corrosion resistance to products of stainless steel.

Now, this invention will be described more specifically below with reference to a working example. It should be noted, however, that this invention is not limited to the example.

EXAMPLES

Ten compositions indicated as Examples 1 to 10 in Table 1 were individually stirred to obtain thorough solutions constituting rust removing agents. For comparison, five compositions having a surfactant, oxalic acid, glycolic acid, and citric acid incorporated in varying combinations indicated in the same table in an aqueous solution of concentrated phosphoric acid were prepared as rust removing agents.

Two stainless steel sheets (SUS 304 and SUS 430) allowed to rust by standing outdoors for one year were cut into small pieces. The small pieces were kept immersed for 15 minutes in the ten rust removing agents of Examples 1 to 10 and the five rust removing agents of Comparative Experiments 1 to 5. They were removed from the rust removing agents and visually examined as to the extent of rust removal.

The results were as shown in Table 1.

TABLE 1

| | Examples | | | | | | | | | | Comparative Experiments | | | | |
|---|---|---|---|---|---|---|---|---|---|---|---|---|---|---|---|
| | 1 | 2 | 3 | 4 | 5 | 6 | 7 | 8 | 9 | 10 | 1 | 2 | 3 | 4 | 5 |
| Compositions | | | | | | | | | | | | | | | |
| Concentrated phosphoric acid (specific gravity of 1.7) | 100 | 100 | 100 | 100 | 200 | 100 | 100 | 100 | 100 | 200 | 100 | 100 | 100 | 100 | 200 |
| Glyceric acid | 1 | 5 | | | | | | | | | | | | | |
| Sodium glycerate | | | 3 | 5 | 5 | | | | | | | | | | |
| Gluconic acid | | | | | | 1 | 5 | | | | | | | | |
| Potassium gluconate | | | | | | | | 3 | 5 | 5 | | | | | |
| POE Nonylphenyl ether (NOIGEN EA120) | 0.1 | 0.1 | | | | 0.1 | | | | 0.1 | 0.1 | | | | |
| POE.POP Block polymer (PLURONIC) | | | 0.1 | 0.1 | 0.1 | | 0.1 | 0.1 | 0.1 | | | | | | |
| Oxalic acid | | | | | | | | | | | | 10 | | | |
| Glycolic acid | | | | | | | | | | | | | 10 | | |
| Citric acid | | | | | | | | | | | | | | 10 | 10 |
| Water | 100 | 100 | 100 | 100 | 100 | 100 | 100 | 100 | 100 | 100 | 100 | 100 | 100 | 100 | 100 |
| Test results | | | | | | | | | | | | | | | |
| SUS 304 | ○ | ◎ | ◎ | ◎ | ◎ | ◎ | ◎ | ◎ | ◎ | ◎ | x | x | x | x | x |
| SUS430 | ◎ | ◎ | ◎ | ◎ | ◎ | ◎ | ◎ | ◎ | ◎ | ◎ | x | x | Δ | x | x |

In the table, "POE nonylphenyl ether" designates polyoxyethylene nonylphenyl ether produced and sold under trademark "NOIGEN" by Dai-ichi Kogyo Seiyaku K. K., Japan and "POE.POP block polymer" designates polyoxyethylene polyoxypropylene block polymer produced and sold under trademark "PLURONIC" by Asahi Denka Kogyo K.K., Japan. Further, in the table, the mark (◎) denotes a rust removing agent which attained perfect removal of rust, the mark (○) a rust removing agent which achieved substantially perfect removal of rust, the mark (Δ) a rust removing agent which obtained incomplete removal of rust, and the mark (x) a rust removing agent which produced virtually no removal of rust.

It can be clearly noted from Table 1 that the rust removing agents of the comparative examples prepared by using a carhoxylic acid or an hydroxycarboxylic acid instead of a polyhydroxymonocarboxylic acid or a salt thereof contemplated by this invention failed to attain such quick and efficient removal of rust f rom a stainless steel surf ace as attained by the rust removing agents of this invention.

Small pieces of fresh stainless steel sheets (SUS 304 and SUS 430) were kept immersed f or 60 minutes in the 10 rust removing agents of Examples 1 to 10 and the rust removing agents of Comparative Experiments 1 to 5. They were removed from the rust removing agents, washed with water, and examined as to surface condition and as to change in weight. The examination failed to detect any discernible change in surface condition or weight.

What is claimed is:

1. A rust removing agent for a stainless steel surface, consisting essentially of an aqueous solution of concentrated phosphoric acid; 0.5 to 20 parts by weight, based on 100 parts by weight of the phosphoric acid, of a polyhydroxymonocarboxylic acid or a salt thereof selected from the group consisting of glyceric acid, trihydroxybutyric acid, 3,4,5-trihydroxyhexanoic acid, gluconic acid and salts thereof; and a surfactant.

2. A rust removing agent according to claim 1, wherein said aqueous solution of phosphoric acid consists of 100 to 200 parts by weight of concentrated phosphoric acid adjusted to specific gravity of 1.7 incorporated in 100 parts by weight of water.

3. A rust removing agent according to claim 2, wherein said surfactant is present in said rust removing agent in an amount in the range of from 0.01 to 5 parts by weight based on 100 parts by weight of said concentrated phosphoric acid adjusted to specific gravity of 1.7.

4. A rust removing agent according to claim 1, wherein said surfactant is a member selected from the group consisting of polyoxyethylene allylalkyl ethers, polyoxyethylene alkyl ethers, and polyoxyethylenepolyoxypropylene block polymers.

5. A rust removing agent for a stainless steel surface, consisting essentially of an aqueous solution of concentrated phosphoric acid; 0.5 to 20 parts by weight, based on 100 parts by weight of the phosphoric acid, of a polyhydroxymonocarboxylic acid or a salt thereof selected from the group consisting of glyceric acid, trihydroxybutyric acid, 3,4,5-trihydroxyhexanoic acid, gluconic acid and salts thereof; a surfactant; and an inorganic acid in an amount of not more than 5 parts by weight, based on 100 parts by weight of said concentrated phosphoric acid, or an organic acid in an amount of not more than 10 parts by weight, based on 100 parts by weight of said concentrated phosphoric acid.

6. A rust removing agent according to claim 5, wherein said inorganic acid is at least one member selected from the group consisting of hydrofluoric acid, sulfuric acid, and nitric acid and said inorganic acid is present in the rust removing agent in an amount of not more than 5 parts by weight, based on 100 parts by weight of said concentrated phosphoric acid adjusted to specific gravity of 1.7.

7. A rust removing agent according to claim 5, wherein said organic acid is at least one member selected from the group consisting of sulfamic acid and sulfanilic acid and said organic acid is present in the rust removing agent in an amount of not more than 10 parts by weight based on 100 parts by weight of said concentrated phosphoric acid adjusted to specific gravity of 1.7.

* * * * *